United States Patent Office 3,464,673
Patented Sept. 2, 1969

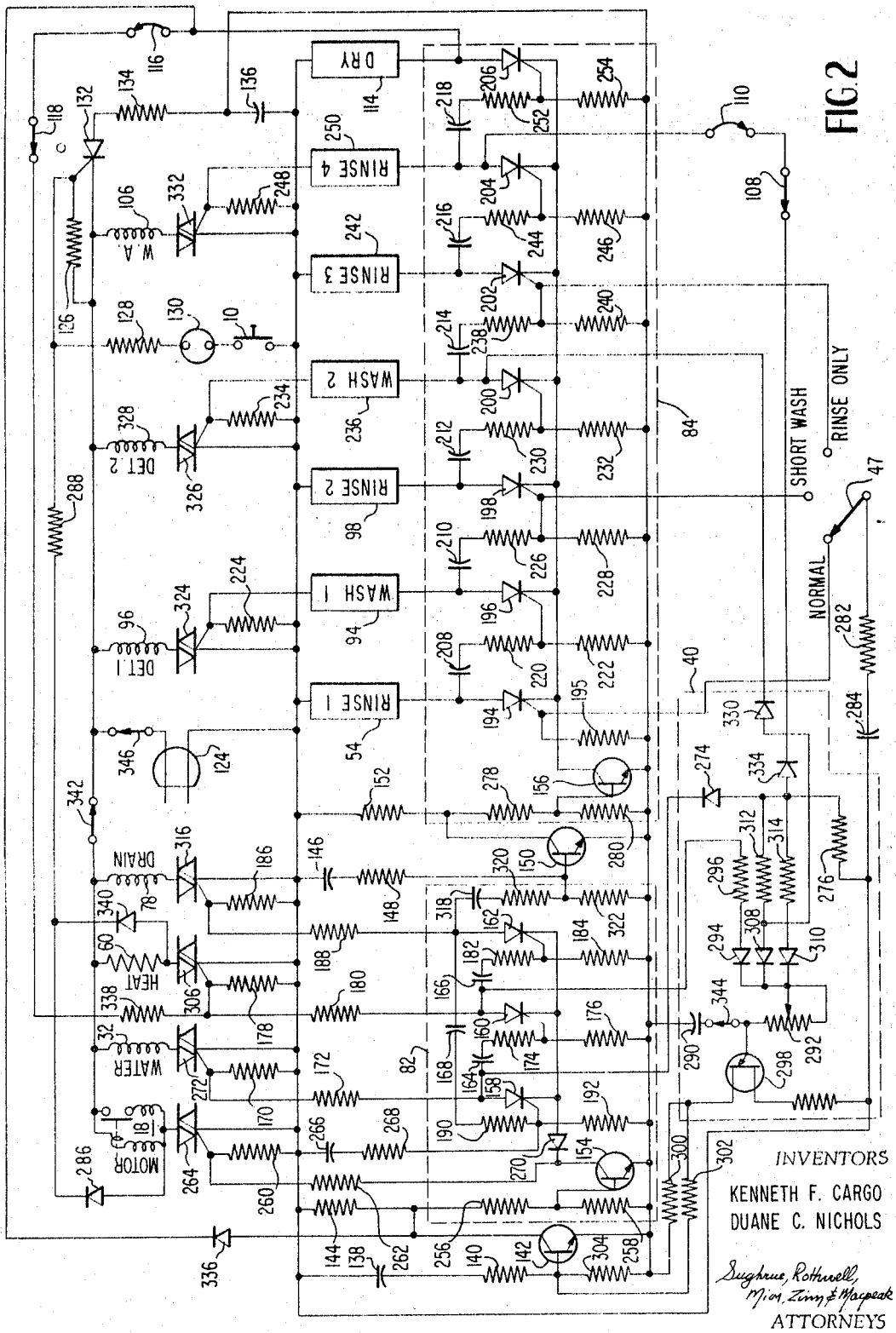

3,464,673
SOLID STATE CONTROL SYSTEM FOR CYCLICALLY OPERATED APPLIANCES
Kenneth F. Cargo, Coloma, and Duane C. Nichols, St. Joseph, Mich., assignors to Whirlpool Corporation, Benton Harbor, Mich., a corporation of Delaware
Filed Apr. 20, 1967, Ser. No. 632,374
Int. Cl. B01f *3/00;* B28c *7/00*
U.S. Cl. 259—1     12 Claims

ABSTRACT OF THE DISCLOSURE

A solid state control circuit for a dishwasher or other cyclically operated appliance including an RC Timer having a number of selective delays, a three stage ring counter for controlling the water flow, heat and recirculate, and drain functions of each cycle, and a sequential stepping switch for controlling the advance from one cycle to the next. Both the counter and the stepping switch select the appropriate delay in the Timer for each function. The Timer advances the counter after each delay and the counter advances the stepping switch after each cycle.

RELATED APPLICATIONS

U.S. application Ser. No. 566,160 of Alan Wennerberg et al. filed July 18, 1966, entitled "Electronic Dishwasher Control With Condition Responsive Cycling," and assigned to the same assignee as the present invention.

BACKGROUND OF THE INVENTION

This invention generally relates to control systems for cyclically operated appliances, such as dishwashers, washing machines, etc. More particularly, it relates to an all electronic, solid state control system for causing the appliance to perform repetitive, timed operating functions common to each cycle and for advancing the appliance program from one cycle to the next.

The great majority of the appliance control systems of the prior art are primarily electro-mechanical in nature. They generally comprise a small electric motor driving a rotary switch through reduction gearing. The switch includes a plurality of appropriately spaced contacts on a movable member, which, when they mate with cooperating stationary contacts, cause the performance of the necessary machine functions. These electro-magnetic controls suffer from a number of serious disadvantages, which often result in untimely breakdowns and costly repairs. For one thing, the control systems for most washing appliances are necessarily exposed to high temperature and humidity environments, which greatly accelerates contact wear and corrosion. These conditions also tend to rapidly dissolve and evaporate lubricants, which promotes the mechanical wear and failure of the moving parts in the system.

SUMMARY

These and other disadvantages of the prior art control systems are overcome by this invention through the provision of an all electronic, solid state appliance control system which is relatively immune to the adverse environmental effects stated above. It basically comprises a Timer, a counter section, and a sequential stepping switch section. The Timer is an RC circuit having a number of parallel, converging charging paths that may be shunted by certain stages in the counter and stepping switch to provide different delay times. The Timer output steps the counter, which is a three stage ring circuit with each stage controlling one of the water flow, heat and recirculate, and water drain functions common to washing apparatus cycles. At the end of each rinse or wash cycle, the counter advances the stepping switch, which has a plurality of bistable stages equal to the number of, and corresponding to, the cycles in the normal operating program of the apparatus. The stepping switch stages operate cycle indicators and control other functions unique to certain cycles, such as the detergent discharges for the washing cycles. Other features of the invention include an option switch for by-passing some of the cycles in the normal operating program, a thermostatically controlled heat and recirculate function during one of the cycles to insure the killing of most bacteria and other microorganisms, and a thermostatically terminated drying cycle.

Being entirely electronic in nature, there are no moving parts involved and therefore no mechanical wear and fatigue, and no contact corrosion problems. Moreover, since all of the active elements in the circuit are solid state devices, the invention lends itself readily to integrated and/or printed circuit fabrication, with attendant compactness, reliability and low power dissipation.

BRIEF DESCRIPTION OF THE DRAWINGS

The foregoing and other features and advantages of the invention will be apparent from the following more particular description of a preferred embodiment of the invention, as illustrated in the accompanying drawings, in which:

FIGURE 2 shows a detailed schematic diagram of a circuit for implementing the logic diagram of FIGURE 1.

DESCRIPTION OF THE PREFERRED EMBODIMENT

Figure 1:
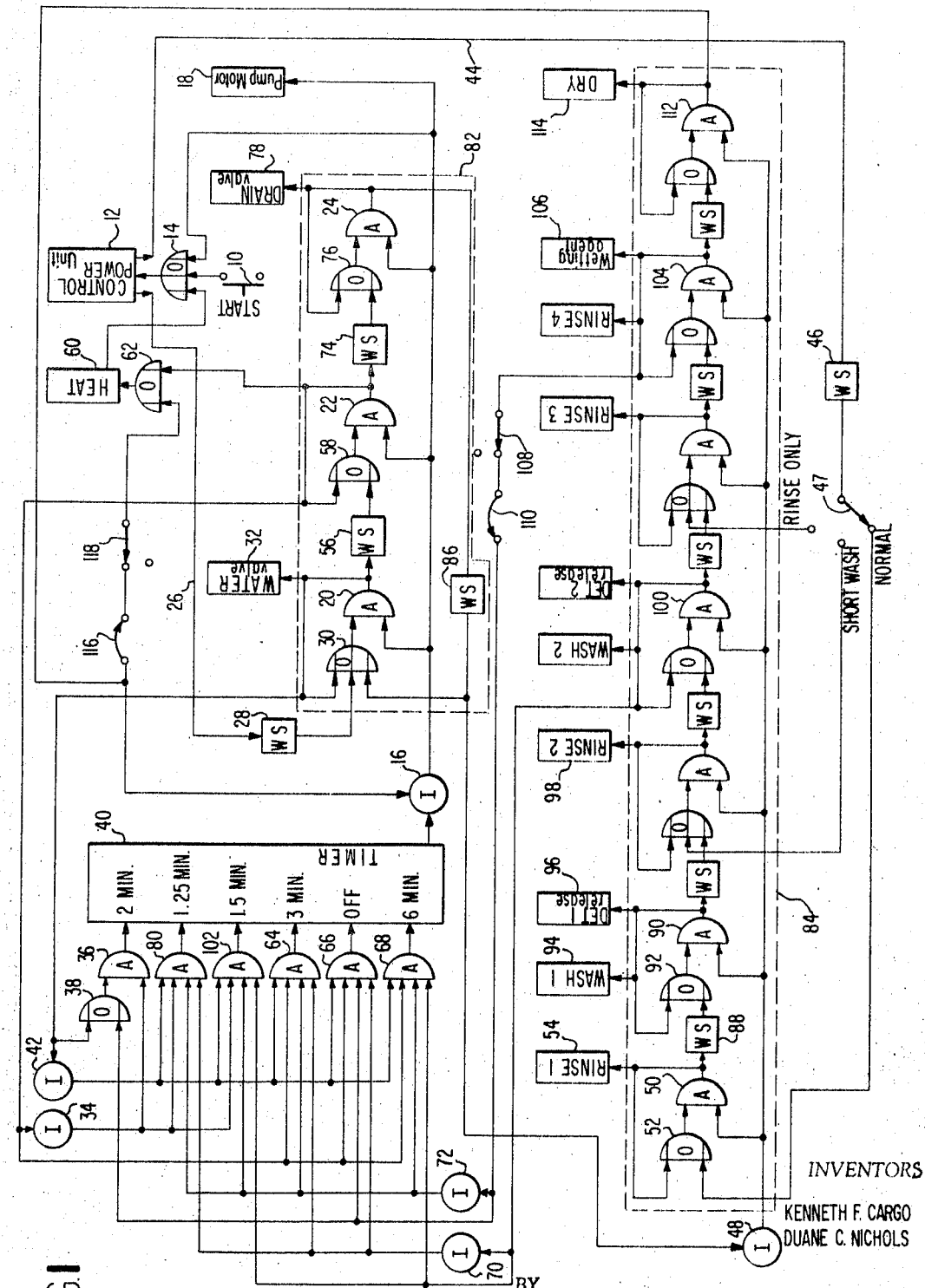
FIGURE 1 shows a logic diagram in block form of an appliance control system constructed in accordance with the teachings of this invention and specifically adapted to be used with an automatic dishwasher.

Referring now to the logic diagram of FIGURE 1, the operation of an automatic dishwasher controlled thereby will be traced through a complete cycle. Initially, all outputs are zero. The momentary closing of start switch 10 supplies a signal from an external source (not shown) to the Control Power Unit 12 through OR gate 14. The Control Power Unit actually develops more than just the two output signals shown, but these have been omitted in the interests of simplicity. It will suffice to state that the energization of the Control Power Unit is a prerequisite to the generation of any other signals in the diagram with the exception of the start signal.

When the Control Power unit 12 is energized the raised output from Inverter 16 energizes the unidirectional Water Pump Motor 18, supplies a latching signal to OR gate 14 to hold the Control Power Unit on when the start switch is released, and conditions AND gates 20, 22 and 24. The Control Power Unit 12 raises a signal over line 26 to actuate Wave Shaper 28 which produces a single output pulse. This pulse is fed through OR gate 30 to AND gate 20, and, in conjunction with the raised output from Inverter 16, causes AND gate 20 to produce an output signal. This signal energizes the Water Valve 32 which initiates the filling of the dishwasher with hot tap water, latches AND gate 20 on by means of a feedback loop through OR gate 30, and, in conjunction with the raised output of Inverter 34, actuates AND gate 36 through OR gate 38 which initiates a 2 minute time delay in the Timer 40. The lowered output from Inverter 42 prevents any of the other time delays from being accidentally initiated.

The initial energization of the Control Power Unit 12 also raises a signal on line 44 to actuate Wave Shaper 46 whose output pulse passes through option switch 47, and in conjunction with the raised output from Inverter 48, actuates AND gate 50 through OR gate 52. The output of AND gate 50 is latched by means of a feedback loop through OR gate 52 and energizes the Rinse 1 indicator 54. This indicator is preferably a lamp circuit located on the control panel of the dishwasher which signals the operator that the machine is in the first rinse cycle.

It is to be noted that all of the foregoing circuit functions have taken place in less than one second. At this stage, the bottom of the dishwasher is filling with hot water which is being sprayed and recirculated throughout the interior or washing chamber of the machine to thoroughly wet all of the dirty dishes and utensils and loosen their food deposits.

At the expiration of the 2 minute delay, the Timer produces an output pulse which results in a negative pulse from Inverter 16. This deenergizes AND gate 20 which then shuts off the Water Valve 32 and terminates the fill function. The dropping of the output from AND gate 20 also actuates Wave Shaper 56 which produces a pulse of longer duration than the Timer pulse. Consequently, when the Timer pulse drops and the output from Inverter 16 is again raised to condition AND gates 20, 22 and 24, the pulse from Wave Shaper 56 actuates AND gate 22 through OR gate 58. The raised output from AND gate 22 energizes the Heat Unit 60 through OR gate 62, latches itself by means of a feedback path through OR gate 58, and supplies one of the inputs for AND gates 64, 66 and 68 at the Timer 40. The other inputs for AND gate 64 are supplied by the raised signals from Inverters 42, 70 and 72, and thus AND gate 64 is actuated to initiate a 3 minute time delay. It is to be noted that the output pulse from the Timer 40 at the expiration of any time delay is not of sufficient duration to effect the Control Power Unit 12 or the Pump Motor 18. The Heat Unit 60 serves to maintain or even raise the temperature of the first rinse water as it is being recirculated throughout the washing chamber.

An alternate mode of operation could be realized by having the outputs of AND gates 22 and 24 fed to an additional OR gate whose output would energize the Pump Motor 18. In this manner, the Pump Motor would not be energized during the fill cycle, but this is perfectly acceptable since the tap water pressure is usually adequate to fill the machine. Furthermore, it is not always necessary that the Heat Unit 60 be energized during the recirculation cycle since the tap water temperature in most homes is sufficiently high to insure adequate washing performance. This could be implemented by merely removing the connection between AND gate 22 and OR gate 62. In addition, since water has such a high specific heat, the temperature of the drain water is only slightly lower than the temperature of the fill water.

After the 3 minute time delay has run, the raised Timer pulse drops the output of Inverter 16 which deenergizes AND gate 22 and terminates the recirculate function. At the same time, Wave Shaper 74 produces a relatively long pulse in response to the dropping of AND gate 22's output which actuates AND gate 24 through OR gate 76 as soon as the Timer pulse ends and the output from Inverter 16 is raised. AND gate 24 latches itself on through OR gate 76 and energizes the Drain Valve 78 to empty the dirty rinse water from the machine. The dropping of AND gate 22's output shuts off the heat through OR gate 62 and also raises the output from Inverter 34 which actuates AND gate 80 at the Timer input in conjunction with raised signals from Inverters 42, 70 and 72. This initiates a 1.25 minute time delay to allow sufficient time for the rinse water to be completely drained from the machine.

The foregoing operations constitute the fill, recirculate and drain functions of a dishwasher cycle, and are repeated during each subsequent rinse and wash cycle. The counter section of the control system, enclosed by the broken line 82, has advanced through a full three stage count, and the sequential stepping switch section, enclosed by the broken line 84, has received its initial start pulse.

At the end of the 1.25 minute time delay, the Timer pulse results in the deenergization of AND gate 24, which shuts the Drain Valve 78 to complete the first rinse cycle. The dropping of AND gate 24's output also actuates Wave Shaper 86 whose output pulse in turn actuates AND gate 20 again through OR gate 30 to initiate a new water fill function and 2 minute time delay, and causes the output of Inverter 48 to momentarily drop. This deenergizes AND gate 50 to extinguish the Rinse 1 indicator and actuate Wave Shaper 88, whose output energizes AND gate 90 through OR gate 92 as soon as Inverter 48's output is raised again. AND gate 90 latches itself through OR gate 92 and energizes the Wash 1 indicator 94 and the Detergent 1 release mechanism 96. This mechanism releases a first load of detergent powder into the machine chamber where it is dissolved in the inflowing and recirculating water to effect the desired cleansing action.

The remainder of the first wash cycle proceeds in the same manner as the first rinse cycle with the AND gates 20, 22 and 24 in the counter section 82, which constitute a three-stage ring, being actuated in sequence and having 2 minute, 3 minute and 1.25 minute time delays, respectively. At the termination of this cycle, the machine enters the second rinse cycle which is signaled through the sequential stepping switch section 84 by the extinguishment of the Wash 1 indicator 94 and the illumination of the Rinse 2 indicator 98 and which is identical to the first rinse cycle.

After the second rinse cycle, the machine performs the second wash cycle with the release of a second load of detergent. The sequence for this cycle, i.e., fill, recirculate and drain, is of course the same as for the other wash and rinse cycles, but two of the time delays are different. When AND gate 100 is actuated at the start of the second wash cycle it conditions AND gates 68 and 102 at the Timer input and disables AND gates 64, 66 and 80 through Inverter 70. Consequently, when AND gate 22 in the counter section is actuated at the beginning of the recirculate function, a 6 minute rather than the normal 3 minutes time delay is initiated through the actuation of AND gate 68. This prolongs the second and final wash cycle and its purpose is to insure that the contents of the dishwasher are thoroughly cleaned. When the output from AND gate 22 drops after the 6 minute delay has run, conditioned AND gate 102 at the Timer input is actuated by raised signals from Inverters 34, 42 and 72 to initiate a 1.5 minute drain delay. This 15 seconds of additional time over the normal 1.25 minute drain delay provides a more complete drainage of the soapy water prior to the final rinse cycles.

Following the second wash cycle, the third rinse cycle is performed which is identical to the first and second rinse cycles and has the normal delay times of 2 minutes, 3 minutes, and 1.25 minutes for the fill, recirculate and drain functions, respectively. At the termination of the third rinse cycle, the machine enters the fourth and final rinse cycle, which differs somewhat from the other rinse cycles. When AND gate 104 is actuated at the beginning of the fourth rinse cycle in response to the dropping of AND gate 24's output, a Wetting Agent dispenser 106 is energized to discharge a measured amount of wetting agent into the rinse water. At the same time, a raised signal through the pause by-pass switch 108 and the thermostatic pause terminate switch 110 conditions Timer AND gates 36 and 66 and disables Timer AND gates 64, 68, 80 and 102 through Inverter 72. The thermostatic pause terminate switch 110 senses the water temperature at the bottom of the washing chamber and is set to open at a fixed, relatively high temperature, for example 180° F. Its purpose is to maintain the recirculate function of the final rinse cycle until the Heat Unit 60 raises the water temperature to the preset level to kill most of the bacteria or microorganisms which may be present. This thermostatic control of the final rinse cycle may be by-passed or terminated by manually opening the pause by-pass switch 108, in which case the cycle is performed with the normal time delays.

Assuming that both of the switches 108 and 110 are closed, the water fill function of the fourth rinse cycle is performed with the normal 2 minute time delay. When AND gate 22 in the counter section is actuated to initiate the recirculate function, however, the Timer AND gate 66 is energized by the raised signals from AND gates 22 and 104 and Inverters 42 and 70 which holds the Timer 40 off. When the water temperature reaches the predetermined level, switch 110 opens to release the Timer. AND gate 64 is now actuated by raised signals from AND gate 22 and Inverters 42, 70 and 72 to initiate a 3 minute time delay. The cycle then continues in the normal manner with AND gate 22 being deenergized at the end of the 3 minute delay. At this time the Drain Valve has opened and, assuming thermostatic switch 110 to still be open, Timer AND gate 80 is actuated to provide a drain delay of 1.25 minutes. If switch 110 is closed, a two minute drain delay will be provided by the actuation of Timer AND gate 36 by AND gate 104 and Inverter 34.

When AND gate 112 in the sequential stepping switch section 84 is actuated at the end of the fourth rinse cycle, the Dry indicator 114 is illuminated to signal the beginning of the drying cycle. At the same time, a raised signal is supplied to the Heat Unit 60 through a thermostatic switch 116, an air dry switch 118 and OR gate 62. This signal is also applied to Inverter 16 which holds the latter's output down to disable the counter section 82 and turn off the Pump Motor 18. The Control Power Unit 12 is maintained in its energized state throughout the drying cycle by a signal from the Heat Unit through OR gate 14. The Timer 40 will cycle on a 1.25 minute time delay during the drying cycle since AND gate 80 now sees raised outputs from Inverters 34, 42, 70 and 72, but this will have no effect on the circuit since Inverter 16 is being held in a down state by the output from AND gate 112. The Heat Unit 60 remains energized until the thermostatic switch 116 opens at a predetermined temperature or the air dry switch is opened, at which time the Heat and Control Power Units are deenergized to shut down the system and complete the full dishwasher cycle.

The machine may also be made to perform shortened cycles, if desired, by means of the option switch 47. When the latter is in the short wash position, the machine begins at the second rinse cycle and then proceeds in sequence through the second wash cycle, the third and fourth rinse cycles and the drying cycle. If the option switch 47 is placed in the rinse only position the machine begins at the third rinse cycle and then proceeds to the fourth rinse cycle and the drying cycle in the same manner as described above.

Referring now to the schematic circuit diagram of FIGURE 2 which implements the logic diagram of FIGURE 1, the operation of the dishwasher will again be traced through a complete cycle. Where appropriate, the same reference numerals have been used in both figures to designate like elements of structure.

CONTROL CIRCUIT START UP

The momentary closing of start switch 10 completes a circuit across line plug 124 through resistors 126 and 128 and neon lamp 130. This fires Silicon Controlled Rectifier 132 which conducts through resistor 134 to charge capacitor 136, thus providing DC power to the circuit with capacitor 136 serving as a filter capacitor.

With DC power available, capacitor 138 is charged through resistor 140 and the base-emitter diode of NPN transistor 142 which turns transistor 142 on whereby it conducts through resistor 144. At the same time, capacitor 146 is charged through resistor 148 and the base-emitter diode of NPN transistor 150, which renders the latter conductive through resistor 152. The conduction of transistors 142 and 150 holds NPN transistors 154 and 156, respectively, in their non-conductive states. With transistor 154 off SCR's 158, 160 and 162 in the counter section 82 are held off which permits their advancing capacitors 164, 166 and 168 to charge through the gate resistors of the SCR's as follows: capacitor 164 charges through resistors 170, 172, 174 and 176; capacitor 166 charges through resistors 178, 180, 182 and 184; capacitor 168 charges through resistors 186, 188, 190 and 192. In a similar manner, the non-conduction of transistor 156 holds off SCR's 194, 196, 198, 200, 202, 204 and 206 in the sequential stepping switch section 84 which permits advancing capacitors 208, 210, 212, 214, 216 and 218 to charge through the SCR gate resistors as follows: capacitor 208 charges through the Rinse 1 indicator 54 and resistors 220 and 222; capacitor 210 charges through resistor 224, the Wash 1 indicator 94 and resistors 226 and 228; capacitor 212 charges through the Rinse 2 indicator 98 and resistors 230 and 232; capacitor 214 charges through resistor 234, the Wash 2 indicator 236 and resistors 238 and 240; capacitor 216 charges through the Rinse 3 indicator 242 and resistors 244 and 246; capacitor 218 charges through resistor 248, the Rinse 4 indicator 250 and resistors 252 and 254. The charging currents through the Rinse and Wash indicators are not of sufficient magnitude or duration to illuminate them.

As soon as capacitor 138 becomes fully charged, which takes only a fraction of a second, transistor 142 cuts off, and this in turn allows current through resistors 144, 256 and 258 which turns transistor 154 on. A first conduction path for transistor 154 exists through resistors 260 and 262, and this current fires TRIAC 264 to energize the Water Pump Motor 18. A second conduction path for transistor 154, of a transient nature, permits the charging of capacitor 266 through resistor 268, the gate-cathode junction of SCR 158 and diode 270. This fires SCR 158 which conducts through resistors 170 and 172, diode 270 and transistor 154 to fire TRIAC 272 and energize the Water Valve coil 32 to initiate the fill function. A parallel conduction path for SCR 158 also exists through diode 274 and resistor 276, which affects the timing circuit as developed below. The firing of SCR 158 also completes a discharge path for capacitor 164 through SCR 158, diode 270, transistor 154 and resistors 174 and 176, which primes the counter section for advancing to the recirculate function.

In a somewhat similar manner, transistor 150 is cut off when capacitor 146 becomes charged, which in turn allows current through resistors 152, 278 and 280 to saturate transistor 156. The latter conducts through the gate-cathode path of SCR 194, option switch 47 and resistor 282 to charge capacitor 284, which fires SCR 194. This provides a current path through the Rinse 1 indicator 54, SCR 194 and transistor 156 which illuminates the indicator to signal the operator that the machine is in the Rinse 1 cycle. The conduction of SCR 194 also causes the discharge of capacitor 208 through transistor 156 and resistors 220 and 222, which primes the sequential stepping switch section for advancing to the Wash 1 cycle. Resistor 195 connected to the cathode of SCR 194 is a stabilizing resistor to prevent the accidental firing of SCR 194.

At this point, the machine is in the Rinse 1 cycle with water filling the machine chamber and being recirculated by the pump motor. Once again, all of the foregoing circuit operations have taken place in less than one second. With the pump motor TRIAC 264 energized current also flows through diode 286 and resistors 288 and 126 to maintain gate current pulses for SCR 132 and keep the circuit energized after the start switch 10 is released.

FILL FUNCTION TIMING

To provide the 2 minute time delay for the water fill function, capacitor 290 slowly charges through the unshunted portion of potentiometer 292, diode 294, and resistors 296, 180 and 178. The circuit parameters are chosen so that after 2 minutes the charge on capacitor 290 reaches a sufficient level to fire or avalanche unijunction transistor 298, which then discharges the capacitor through resistors 300, 302 and 304. This turns transistor 142 on which in turn cuts off transistor 154. The nonconduction of transistor 154 interrupts the current path for SCR 158 and extinguishes the latter, which deenergizes TRIAC 272 and the Water Valve coil 32 to terminate the fill function and permits capacitor 164 to begin recharging through resistors 170, 172, 174 and 176. After capacitor 290 has discharged transistor 142 cuts off which turns transistor 154 on again, and this permits the charging current for capacitor 164 to fire SCR 160. This in turn energizes TRIAC 306 and Heat Unit 60 which initiates the recirculate function. At the same time, capacitor 166 discharges through SCR 160, diode 270, transistor 154 and resistors 184 and 182 to prime the counter for advancing to the drain function.

RECIRCULATE FUNCTION TIMING

The normal recirculate time of 3 minutes is provided by capacitor 290 charging through potentiometer 292, the parallel paths including diodes 308 and 310 and resistors 312 and 314, and resistor 276. The previous charging path through diode 294 and resistor 296 is ineffective due to the conduction of SCR 160 and transistor 154. When the charge on capacitor 290 avalanches transistor 298, the stepping procedure outlined above is repeated, with transistor 142 going on, transistor 154 and SCR 160 being cut off, and capacitor 166 charging to fire SCR 162 after capacitor 290 has discharged and transistor 154 has turned on again. The conduction of SCR 162 energizes TRIAC 316 and the Drain Valve coil 78 to initiate the drain function, while the extinguishment of SCR 160 deenergizes TRIAC 306 and the Heat Unit 60 to terminate the recirculate function. At the same time, capacitor 168 is discharged through SCR 162, diode 270, transistor 154 and resistors 192 and 190 to prime the counter for advancing back into the fill function for the next cycle. Capacitor 318, which was previously charged through resistors 186, 188, 320 and 322, is similarly discharged through SCR 162, diode 270, transistor 154 and resistors 322 and 320 to prime the counter section 82 for advancing the sequential stepping switch section 84 into the Wash 1 cycle.

DRAIN FUNCTION TIMING

The water drain function time delay of 1.25 minutes is provided by capacitor 290 charging through three parallel paths as follows: potentiometer 292, diode 294, and resistors 296, 180 and 178; potentiometer 292, diode 308 and resistors 312 and 276; potentiometer 292, diode 310 and resistors 314 and 276. When capacitor 290 avalanches transistor 298 after 1.25 minutes the stepping procedure is repeated with SCR 162 being cut off to allow capacitor 168 to charge and fire SCR 158. This deenergizes TRIAC 316 and the Drain Valve coil 78 to terminate the drain function, and fires TRIAC 272 to energize the Water Valve coil 32 and initiate a new fill function. At the same time, the cut off of SCR 162 permits capacitor 318 to charge through resistors 186, 188, 320 and 322 to render transistor 150 conductive. This in turn cuts off transistor 156 and SCR 194, and permits capacitor 208 to begin charging. As soon as capacitor 318 becomes charged, transistor 150 cuts off again which saturates transistor 156. The charging current for capacitor 208 now fires SCR 196 which energizes the Wash 1 indicator 94 and fires TRIAC 324 to energize the Detergent 1 release coil 96 and discharge a measured amount of detergent into the machine chamber. Capacitor 210 discharges through SCR 196, transistor 156 and resistors 228 and 226 to prime the sequential stepping switch section for advancing to the Rinse 2 cycle.

WASH 1 CYCLE

The fill, recirculate and drain functions described above for the Rinse 1 cycle are repeated with the same time delays during the Wash 1 cycle. When transistor 156 is momentarily cut off at the end of the drain function SCR 196 is extinguished and the charging of capacitor 210 fires SCR 198 when transistor 156 turns on. This terminates the Wash 1 cycle by extinguishing the Indicator 94, initiates the Rinse 2 cycle by illuminating the Indicator 98, and permits capacitor 212 to discharge through SCR 198, transistor 156 and resistors 232 and 230 to prime the sequential stepping switch section for advancing to the Wash 2 cycle.

RINSE 2 CYCLE

The fill, recirculate and drain functions for the Rinse 2 cycle repeat as described above with the same time delays. The cut off of transistor 156 after the drain function extinguishes SCR 198 and the Rinse 2 Indicator 98 to terminate the cycle. This permits capacitor 212 to begin charging which fires SCR 200 when transistor 156 conducts again, and this in turn illuminates the Wash 2 Indicator 236, energizes TRIAC 326 and the Detergent 2 release coil 328, and permits capacitor 214 to discharge through SCR 200, transistor 156 and resistors 240 and 238 to prime the stepping switch for advancing the Rinse 3 cycle.

WASH 2 CYCLE

The fill function for the Wash 2 cycle is repeated as described above with the normal time delay of 2 minutes. The time delay during the recirculate function is increased from 3 to 6 minutes, however. This is caused by the conduction of SCR 200 through diode 330 and resistors 312 and 276, which permits the timing circuit capacitor 290 to charge only through the path including potentiometer 292, diode 310 and resistors 314 and 276. The drain function timing is also increased from 1.25 to 1.5 minutes since capacitor 290 can only charge through two of the three parallel paths normally available during the drain period, i.e. capacitor 290 charges through diodes 294 and 310 and resistors 296 and 314, while the third path through diode 308 and resistor 312 is shunted by the conduction of SCR 200.

When transistor 156 is cut off at the end of the drain function, SCR 200 and the Wash 2 indicator 236 are extinguished and the charging of capacitor 214 fires SCR 202 when transistor 156 turns on again to illuminate the Rinse 3 indicator 242. At the same time, capacitor 216 discharges through SCR 202, transistor 156 and resistors 246 and 244 to prime the stepping switch for advancing to the Rinse 4 cycle.

RINSE 3 CYCLE

The Rinse 3 cycle is identical to the Rinse 1 and 2 cycles and is performed with the normal time delays of 2 minutes, 3 minutes, and 1.25 minutes for the fill, recirculate and drain functions, respectively. When transistor 156 is cut off at the end of the cycle, SCR 202 and the Rinse 3 indicator are extinguished, and the charging of capacitor 216 fires SCR 204 when transistor 156 conducts again. This illuminates the Rinse 4 indicator 250, energizes TRIAC 332 and the Wetting Agent dispenser coil 106, and discharges capacitor 218 through SCR 204, transistor 156 and resistors 254 and 252 to prime the stepping switch for advancing to the drying cycle.

RINSE 4 CYCLE

The fill function for the Rinse 4 cycle is performed as described above. When the recirculate function is entered, however, the Timer is held off by the conduction of SCR 160 shunting the charging path for capacitor 290 through resistor 296 and the conduction of SCR 204 through diode 334, pause by-pass switch 108 and the thermostatic pause terminate switch 110 shunting the charging paths through resistors 312 and 314. When the energized Heat Unit 60 raises the water temperature sufficiently to open the thermostatic switch 110, capacitor 290 charges through resistors 312 and 314 to time out the recirculate function after 3 minutes. At the end of the drain function transistor 156 cuts off to extinguish SCR 204 and the Rinse 4 indicator 250, and the charging of capacitor 218 fires SCR 206 to illuminate the Dry indicator 114.

DRYING CYCLE

When SCR 206 is fired, a conductive path is established through resistor 144 and diode 336 which shunts the base resistors 256 and 258 of transistor 154 and holds the latter off regardless of the state of transistor 142. This de-energizes TRIAC 264 and the Pump Motor 18, and prevents the SCRs in the counter section from being fired. A further path is established through thermostatic switch 116, air dry switch 118 and resistors 338 and 178, and this current energizes TRIAC 306 and the Heat Unit 60. The current through resistors 126 and 288, diode 340 and TRIAC 306 re-fires SCR 132 each line current cycle to maintain DC control power during the drying cycle. When the Heat Unit 60 raises the temperature in the machine chamber to a predetermined level the thermostatic switch 116 opens to deenergize TRIAC 306 and shut down the entire circuit.

OPTIONS

The operational description above applies to a normal or full dishwasher cycle. By placing the option switch 47 on the short wash contact the Rinse 1 and Wash 1 cycles may be by-passed. The circuit operation is substantially the same as described above, except that when transistor 156 turns on the first time, the charging of capacitor 284 fires SCR 198 in the stepping switch, which places the machine directly in the Rinse 2 cycle. The remaining cycles are performed in sequence as described above. In a similar manner, both the first and second Rinse and Wash cycles may be by-passed by placing the option switch on the rinse only contact. In this case, SCR 202 is the first SCR fired in the stepping switch after start-up, which initiates the Rinse 3 cycle.

The circuit is further provided with interlock switches 342, 344 and 346. The opening of switch 346 at any time cancels or erases the existing states of the circuit elements and resets everything to its initial condition. The opening of switch 344 stops the Timer operation by interrupting the charging current path for capacitor 290, while the opening of switch 342 interrupts the circuits for the Pump Motor, Heat Unit and Water and Drain Valve coils.

If the thermostatic delay for the recirculate function of the Rinse 4 cycle is not desired, the pause bypass switch 108 may be opened, in which case the normal 3 minute recirculate delay will be provided by the Timer. Should an air dry be desired, switch 118 may be opened which will shut down the entire machine when SCR 206 is fired at the beginning of the drying cycle.

Although the control system has been described in connection with a dishwasher having a unidirectional pump and motor, the same system could be applied to a washer having a bidirectional pump and motor. In such a case, the Drain Valve coil 78 would be replaced by the reverse winding of the motor, and means would be provided to rapidly brake the motor in each direction before reversal.

A further modification that could easily be incorporated in the control system is a turbidity sensor as described in the Wennerberg et al. application Ser. No. 566,160, cited earlier. Such a device generally comprises a light source and photocell disposed on the opposite sides of a transparent section of the drain line for sensing the turbidity of the drain water after the first rinse cycle. If the water is cloudy, indicating that loose food deposits may still be present on the dishes or in the machine, the first rinse cycle is repeated. If the water is sufficiently clear, the first wash cycle is initiated. Such a feature could be implemented by providing logic means for conditioning either AND gates 50 or 90 in FIGURE 1 depending on the output from the turbidity sensor.

While the invention has been particularly shown and described with reference to a preferred embodiment thereof, it will be understood by those skilled in the art that various changes in form and details may be made therein without departing from the spirit and scope of the invention.

What is claimed is:

1. An electronic, solid state control system for a cyclically operated washing apparatus including a liquid chamber for holding articles to be washed, means for admitting liquid into the chamber, means for draining liquid from the chamber, and means for recirculating the liquid within the chamber, comprising:
    (a) a timing circuit (40) having a plurality of selective delays,
    (b) a ring counter (82) stepped by the timing circuit after each delay for controlling the liquid admission means, the liquid draining means and the recirculating means,
    (c) a sequential stepping switch (84) advanced by the counter at the end of each cycle, and
    (d) means responsive to signals from the counter and the stepping switch for selecting the proper delays in the timing circuit.

2. A control system as defined in claim 1 wherein:
    (a) the ring counter has three stages for individually controlling the liquid admission means, the liquid draining means and the recirculating means, and
    (b) the stepping switch comprises a plurality of bistable stages equal to the number of, and corresponding to, the cycles in the normal operating program of the apparatus.

3. A control system as defined in claim 2 further comprising heating means disposed within the chamber and a thermostatic switch (110) responsive to one of the stepping switch stages for preventing the operation of the timing circuit when the heating means is energized until the temperature of the water in the chamber reaches a predetermined level.

4. A control system as defined in claim 2 further comprising:
    (a) heating means disposed in the chamber,
    (b) a thermostatic switch (116) responsive to the last stage of the stepping switch for energizing the heating means until the temperature in the chamber reaches a predetermined level, and
    (c) means (16) responsive to the last stage of the stepping switch for preventing the timing circuit from stepping the counter and for deenergizing the liquid draining means.

5. A control system as defined in claim 2 further comprising an option switch (47) for initially energizing an intermediate stage in the stepping switch, thereby by-passing all of the cycles in the normal operating program corresponding to the preceding stages.

6. A control system as defined in claim 1 wherein the timing circuit comprises:
    (a) a capacitor (290),
    (b) a plurality of charging current paths (296), (312), (314) for the capacitor, and
    (c) means (298) responsive to a predetermined charge on the capacitor for stepping the counter, and wherein
    (d) the means recited in sub-paragraph (d) of claim 1 enables and disables selected ones of the charging current paths in response to signals from the counter and the stepping switch.

7. A control system as defined in claim 6 wherein the ring counter has three stages for individually controlling the liquid admission means, the liquid draining means and the recirculation means, and each stage comprises:
    (a) a silicon controlled rectifier, and (b) a capacitor connected between the anode terminal of the silicon controlled rectifier and the gate terminal of the silicon controlled rectifier in the next stage, whereby the conduction of one silicon controlled rectifier discharges the capacitor connected to its anode terminal until the silicon controlled rectifier is rendered non-conductive, at which time the capacitor is permitted to charge and fire the silicon controlled rectifier in the next stage.

8. A control system as defined in claim 7 wherein the sequential stepping switch has a plurality of bistable stages equal to the number of, and correpsonding to, the cycles in the normal operating program of the apparatus, and each stage comprises:

(a) a silicon controlled rectifier, and
(b) a capacitor connected between the anode terminal of the silicon controlled rectifier and the gate terminal of the silicon controlled rectifier in the next stage, whereby the conduction of one silicon controlled rectifier discharges the capacitor connected to its anode terminal until the silicon controlled rectifier is rendered non-conductive, at which time the capacitor is permitted to charge and fire the silicon controlled rectifier in the next stage.

9. A control system as defined in claim 1 wherein the ring counter has three stages for individually controlling the liquid admission means, the liquid draining means and the recirculation means, and eagh stage comprises:

(a) a silicon controlled rectifier, and
(b) a capacitor connected between the anode terminal of the silicon controlled rectifier and the gate terminal of the silicon controlled recitfier in the next stage, whereby the conduction of one silicon controlled rectifier discharges the capacitor connected to its anode terminal until the silicon controlled rectifier is rendered non-conductive, at which time the capacitor is permitted to charge and fire the silicon controlled rectifier in the next stage.

10. A control system as defined in claim 9 further including a transistor whose emitter-collector path is connected in series in the anode-cathode circuits of the silicon controlled rectifiers and whose conduction is controlled by the timing circuit, whereby the conduction of the ring counter stages is controlled by the transistor in response to the timing circuit.

11. A control system as defined in claim 1 wherein the sequential stepping switch has a plurality of bistable stages equal to the number of, and corresponding to, the cycles in the normal operating program of the apparatus, and each stage comprises:

(a) a silicon controlled rectifier, and
(b) a capacitor connected between the anode terminal of the silicon controlled rectifier and the gate terminal of the silicon controlled rectifier in the next stage, whereby the conduction of one silicon controlled rectifier discharges the capacitor connected to its anode terminal until the silicon controlled rectifier is rendered non-conductive, at which time the capacitor is permitted to charge and fire the silicon controlled rectifier in the next stage.

12. A control system as defined in claim 11 further including a transistor whose emitter-collector path is connected in series in the anode-cathode circuits of the silicon controlled rectifiers and whose conduction is controlled by the ring counter, whereby the conduction of the sequential stepping switch stages is controlled by the transistor in response to the ring counter.

References Cited
UNITED STATES PATENTS

| | | | |
|---|---|---|---|
| 3,152,462 | 10/1964 | Elliott et al. | 68—12 |
| 3,267,303 | 8/1966 | Meyer et al. | 307—141 |
| 3,347,066 | 10/1967 | Klausner | 68—12 |
| 3,359,760 | 12/1967 | Toma | 68—12 |
| 3,398,295 | 8/1968 | Fathauer | 307—141.4 |

ROBERT L. BLEUTGE, Primary Examiner

U.S. Cl. X.R.

68—12; 134—57; 307—141